US007878410B2

(12) United States Patent
Norrby et al.

(10) Patent No.: US 7,878,410 B2
(45) Date of Patent: Feb. 1, 2011

(54) LABEL HAVING A TEMPERATURE-MONITORING FUNCTION, A PACKAGE FOR GOODS PROVIDED WITH A LABEL, AS WELL AS A METHOD AND EQUIPMENT FOR THE APPLICATION OF LABELS TO PACKAGES FOR GOODS

(75) Inventors: Henry Norrby, Järvsö (SE); Mats Nygårdh, Järvsö (SE)

(73) Assignee: Tempix AB, Järvsö (SE)

( * ) Notice: Subject to any disclaimer, the term of this patent is extended or adjusted under 35 U.S.C. 154(b) by 1120 days.

(21) Appl. No.: 11/579,853

(22) PCT Filed: Mar. 28, 2006

(86) PCT No.: PCT/SE2006/000386

§ 371 (c)(1),
(2), (4) Date: Nov. 8, 2006

(87) PCT Pub. No.: WO2007/008129

PCT Pub. Date: Jan. 18, 2007

(65) Prior Publication Data

US 2008/0290174 A1 Nov. 27, 2008

(30) Foreign Application Priority Data

Jul. 8, 2005 (SE) .................................... 0501607

(51) Int. Cl.
*G06K 7/10* (2006.01)

(52) U.S. Cl. .................................. 235/487; 235/462.01

(58) Field of Classification Search ............ 235/462.01, 235/469, 487; 374/102, 160, 161, 162
See application file for complete search history.

(56) References Cited

U.S. PATENT DOCUMENTS 4,812,053 A * 3/1989 Bhattacharjee .............. 374/102
5,888,929 A 3/1999 Iida et al.
2006/0070700 A1 * 4/2006 Cone .......................... 156/249

FOREIGN PATENT DOCUMENTS

WO 01/64430 9/2001
WO WO/2004/050506 * 6/2004
WO WO/2004/092697 * 10/2004
WO WO/2005/026017 * 3/2005

* cited by examiner

*Primary Examiner*—Thien M Le
(74) *Attorney, Agent, or Firm*—Dilworth & Barrese, LLP.

(57) ABSTRACT

In one aspect, a label (1) preferably intended for packages for goods, is provided which has, on one hand, a coloring substance of capacity of producing a print by effect of heat, the color of which print contrasts with the base color of the label, and on the other hand, an agent having the purpose of, at least partially, destroying the contrast between the colors, if the label is exposed to a temperature above a predetermined maximum value, the label having a surface field for a print in the form of a bar-code (3). The label is manufactured from a porous, capillary-suctioning material, in addition to which the agent is included in a loading of a substance (7) that is solid at temperatures up to the maximum value, but becomes liquid above the maximum value, the substance loading being located beside the surface field of the bar-code (3). A package for goods provided with a label, as well as a method and equipment for the application of labels to packages for goods, are also provided.

18 Claims, 3 Drawing Sheets

LABEL HAVING A TEMPERATURE-MONITORING FUNCTION, A PACKAGE FOR GOODS PROVIDED WITH A LABEL, AS WELL AS A METHOD AND EQUIPMENT FOR THE APPLICATION OF LABELS TO PACKAGES FOR GOODS

TECHNICAL FIELD OF THE INVENTION

In a first aspect, this invention relates to a label of the type that comprises, on one hand, a colouring substance of the type that has the capacity of producing a print by the effect of heat, the colour of which print contrasts with the base colour of the label, and on the other hand an agent having the purpose of, at least partially, destroying the contrast between said colours, if the label is exposed to a temperature above a predetermined maximum value, the label having a surface field for a print containing coded information.

In another aspect, the invention also relates to a package for goods provided with a label.

Furthermore, the invention relates to a method as well as equipment for the application of labels on packages for goods.

Packages for goods of the kind in question are foremost intended for foods that have a limited shelf-life and for this reason have to be stored at low temperatures. For instance, quick-frozen foods should be stored below −18° C., while chilled products may be stored at temperatures above the freezing point, e.g., +4° C. and +8° C., respectively.

BACKGROUND OF THE INVENTION

Goods that are packed for the exposure in frozen-food or refrigerated display counters are usually provided with labels, suitably in a completing packing step. In addition to the denomination, origin, and other identification of the goods that may be pre-printed on the label, in said completing packing step there is printed or typed a bar-code that contains information about the package in question and the goods according to standardized article coding systems. The bar-code is usually supplemented by a row of digits, which, in the case of the European Article Numbering EAN 13, contains 13 positions. Upon payment of the goods, the bar-code is read in an optical way by means of a scanner. If the scanner for any reason cannot interpret the barcode, the cashier has to enter the combination of digits of the EAN-code manually in his/her computerized cash register, which slows down the flow of goods through the cash-counter and constitutes a disturbing interruption on an occasion of payment. The optical quality of the bar-code, foremost in respect of the contrasting effect of the code bars with the base colour of the label, is therefore of great importance to a smooth cash-counter flow. The most commonly occurring labels in this connection are made with a thermal-printable layer, which contains a colouring substance that generates a visible print upon supply of heat. The print is achieved by means of a thermal printer that may be located in a packing and labelling equipment in which the labels are applied to the packages for goods.

Thermal-printable materials have a broad application within different application areas, and need no detailed presentation, per se. However, it may be mentioned that thermal-printable materials generally comprise a substrate that is coated or prepared with a colouring substance, or a combination of substances, that at a certain elevated temperature reacts in order to appear in a colour that contrasts with the base colour of the label. Such colouring substances and combinations of substances that trigger colouring reactions by the influence of temperature are well known. Typically, they may consist of pH-sensitive mixtures containing, for instance, precursors of azo dyes, co-reacting binding substances, and substances, which initiate an alkaline reaction, or colourless/pale leuco dyes, and proton-releasing substances, i.e., acids, which together form a contrasting colour when exposed to the elevated temperature, usually 60° C. or higher. The colouring reaction in such compositions of substances, in response to supplied heat, may be a direct result of the inherent thermodynamic properties of the mixture, or be caused by the activation of a thermally unstable reactant, or by a release of a reactant from a protecting encapsulation in a fusible matrix initiated by the supply of heat. Within said technical field, a variety of colouring compositions of substances and colouring substances, acid reactants and binding-matrix substances are known. Without limiting the invention to anyone or any combination of said compositions of substances, it should be mentioned that the literature contains comprehensive lists of known components and compositions that may be included in thermal-printable materials suitable for the practice of the invention. Among said examples of literature, U.S. Pat. No. 4,370,370; U.S. Pat. No. 4,535,347; U.S. Pat. No. 4,591,887; U.S. Pat. No. 4,898,849; U.S. Pat. No. 5,017,821; U.S. Pat. No. 5,288,688; and U.S. Pat. No. 5,354,724 may be mentioned.

A label having a temperature-monitoring function may be made from a label of the type generally described above, which is arranged to generate a visual indication in case the goods, during the handling between the labelling and sale at any instant of time, or during a predetermined total time, has been exposed to a higher storage temperature than the highest allowable one prescribed. In this connection, by visual indication, an indication recordable by an optical scanner as well as an indication visible to the naked eye may be understood. Upon reading of a bar-code by an optical scanner, a verification of the condition of the goods is provided automatically. In this way, quality controls can be carried out simultaneously with the reading of a bar-code for different purposes during the handling of the goods from producer to consumer, an immediate affirmation being obtained that the goods in question up to the reading having been handled under the prescribed temperature conditions as long as the bar-code is readable. Conversely, if the bar-code is not readable, an affirmation is obtained that the goods at some point in the handling chain have been exposed to temperatures that may have degraded the quality thereof.

PRIOR ART

A known label of the type in question is disclosed in WO 01/64430 A1 (see also U.S. Pat. No. 5,888,929 A1). In said publication, a label for a package for goods is provided, which label comprises an upper, thermal-printable layer in which a bar-code has been generated. On top of the bar-code, a transparent strip or tape is attached, the underside of which comprises an adhesive layer prepared with an agent that has the capacity of penetrating down into the thermal-printable layer and in the same produce a reaction that affects the readability of the bar-code, particularly in the form of a gradually appearing colouring or blackening as a function of time and temperature.

As has been mentioned above, the scanning of the bar-code is dependent on a good or sharp optical contrasting effect between the coloured bars of the code and intermediate, uncoloured surfaces. It will be appreciated that every additional layer on top of the bar-code has a filtering or light-scattering impact on the light beam, which has to pass such a superjacent layer two times before being read in the scanner. Therefore, the risk is evident that a tape or strip, which contains a backing material, an adhesive layer and a reactive substance included therein, and which is applied on top of the bar-code, may affect the readability negatively also in case the goods have been stored under the prescribed temperature conditions.

SUMMARY OF THE INVENTION

The present invention aims at obviating the above-mentioned drawbacks of the label known by WO 01/64430 A1, and at providing an improved label and package for goods provided with a label. Hence, a primary object of the invention is to provide a label, the bar-code of which is reliably and distinctly readable as long as the goods are stored under the prescribed temperature conditions, but becomes unreadable in an irreversible way, as soon as the highest allowable storage temperature is exceeded during a predetermined total period of time. It is also an object to provide a label that is simple and inexpensive to manufacture, in order to, in such a way, allow the packages for goods to carry the cost of the temperature-monitoring function.

According to the invention, the above-mentioned objects are attained by means of the features defined herein. Preferred embodiments of the label according to the invention are furthermore defined herein.

In another aspect, the invention also relates to a package for goods provided with a label. The features of said package for goods are seen in the description herein.

Further, the invention relates to a method and equipment for the application of labels according to the invention on packages for goods. The features of the equipment according to the invention are seen in the description herein, preferred embodiments of the equipment also being defined herein.

The method according to the invention is also seen in the description herein.

Instead of—such as is disclosed in WO 01/64430 A1—using a strip or tape covering the bar-code and including an agent to destroy the contrast of the code bars with the base colour of the label upon unallowed exceeding of temperature, the invention is based on the idea of supplying a loading of a substance to a porous label substrate having a considerable capillary absorption capacity, which substance contains the contrast-destroying agent, and is of the type that is solid up to a definite temperature, but becomes liquid above the same, the substance loading being located beside the bar-code. In such a way, the code bars remain intact and distinctly readable as long as the highest allowable temperature value is not exceeded. Not until when and if the temperature value is exceeded, and the substance trans-forms into the liquid state, the readability of one or more code bars is destroyed in an irreversible way. Said destruction of the contrast of the code bars with the base colour of the label can be achieved by the fact that the substance contains substance components that affect the colour of the code bars. For instance, a substance component may be used that activates the previously unutilized colouring substance in the thermal-printable layer that surrounds the individual code bars, and in such a way colour the substrate around the bars, in such a way that the same are concealed and become unreadable. Alternatively, the substance may contain a substance component that bleaches the colour of the printed code bars.

By "solid" is meant, in this treatise, that the substance is non-liquid, and by no means it has to be stiff and hard below said maximum temperature value. Compared with the liquid physical condition, no limiting walls are required to keep a solid body together, but it may very well be variable in shape and, e.g., be gelatinous having a shape that even alters under the influence of gravity. Adjectives such as semi-plastic, formable and elastic may very well be appropriate to describe the properties of the substance before the same transforms into the liquid state at the maximum temperature value, i.e., becomes a liquid. Within the scope of the invention, it is also included that the substance may be powdered in the solid state.

FURTHER ELUCIDATION OF PRIOR ART

By SE 0302455-1, a label is previously known including a liquid being semi-plastic in the cool state and liquid in the warm state, which liquid is arranged to affect the readability of a bar-code included in the label. In this case, however, the liquid is utilized only to wet and make the label substrate transparent with the object of exposing or making visible prints in the underside of the label. In other words, the liquid contains no agents or substance components that affect the colour of the code bars.

BRIEF DESCRIPTION OF THE APPENDED DRAWINGS

Figure 2:
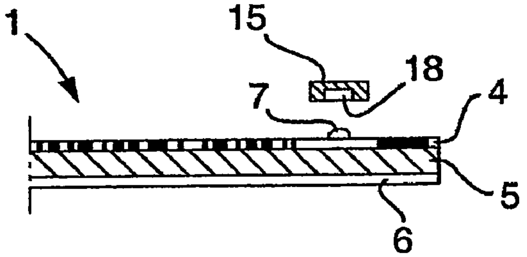
FIG. 2 is a partial cross section through a first embodiment of the proper label according to the invention, a liquid loading included in the label being shown in a semi-plastic state.
Figure 4:
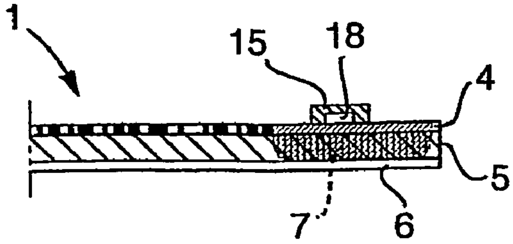
Figure 5:
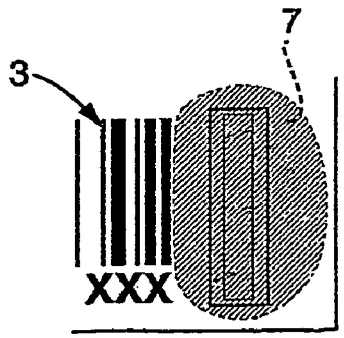
Figure 6:
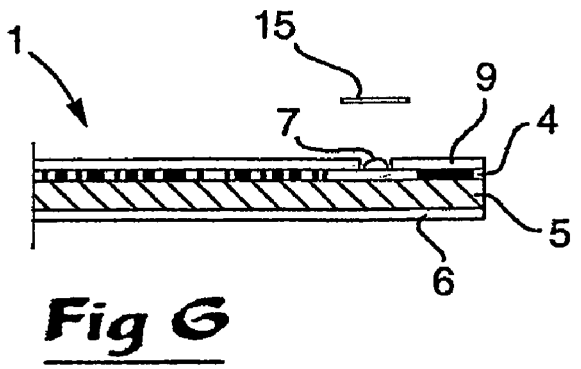
Figure 7:
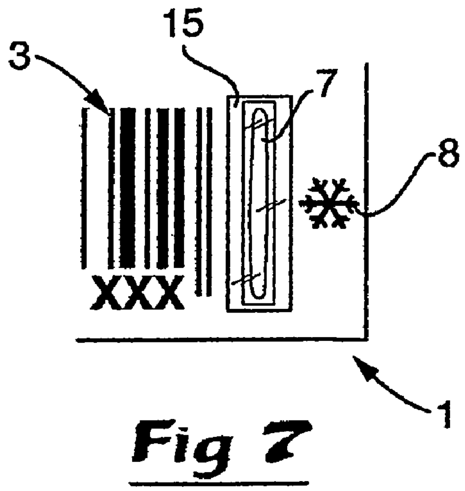
Figure 8:
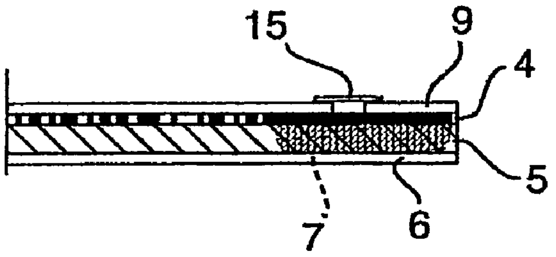
Figure 9:
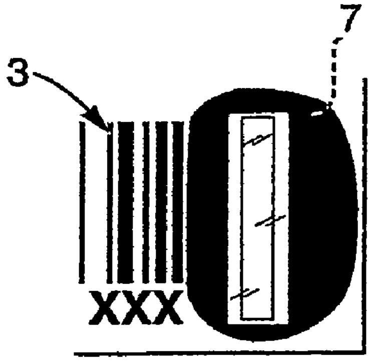
Figure 10:
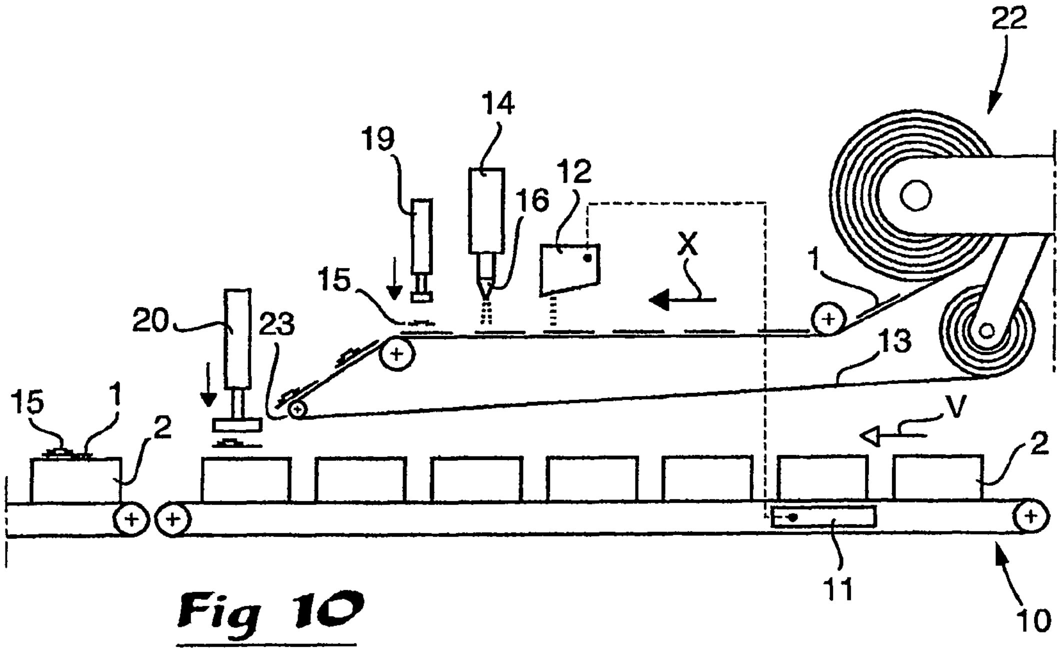
Figure 11:
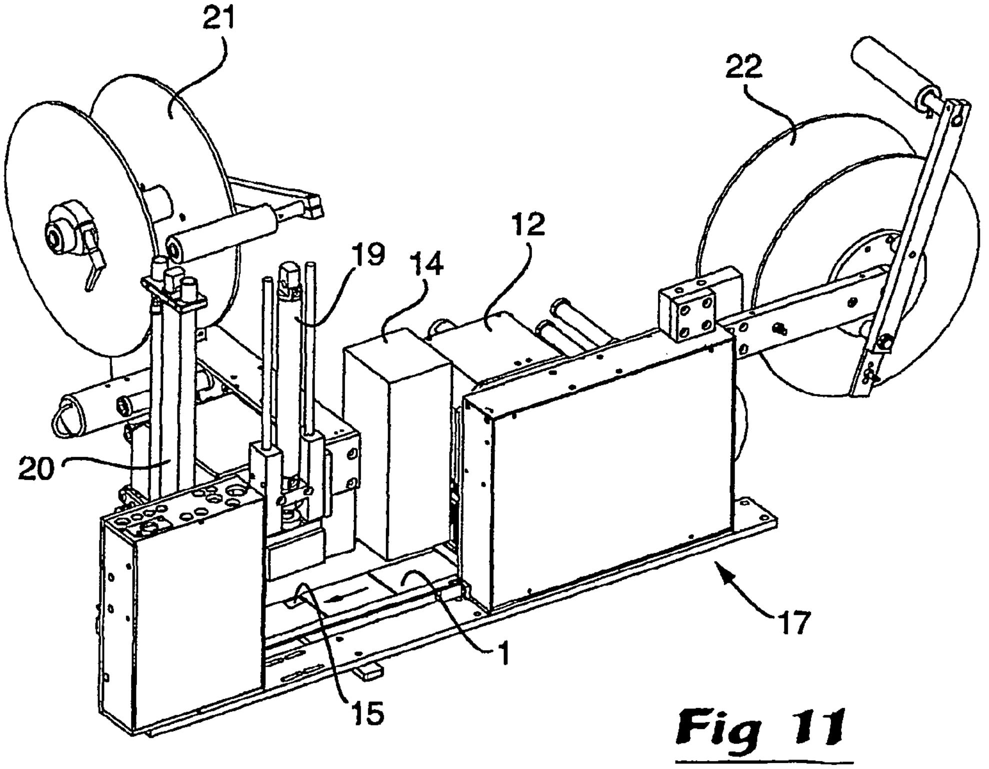

FIG. 4 is a cross section corresponding to FIG. 2 and showing the same label in a state when the liquid has spread in the label, FIG. 5 is a partial plan view showing the label in the same state as in FIG. 4, FIG. 6 is a cross section of an alternative embodiment of a label having a liquid loading in a semi-plastic state, FIG. 7 is a partial plan view of the label according to FIG. 6, FIG. 8 is a cross section showing the label according to FIGS. 6 and 7 with the liquid in a liquid state, FIG. 9 is a plan view of the label in the same state as in FIG. 8, FIG. 10 is a schematic illustration of equipment accomplished in accordance with the invention for the application of labels to packages for goods, and FIG. 11 is an enlarged perspective view of a device, included in the equipment, for the preparation of the labels before the application to the packages for goods.

DETAILED DESCRIPTION OF PREFERRED EMBODIMENTS OF THE INVENTION

Figure 1:
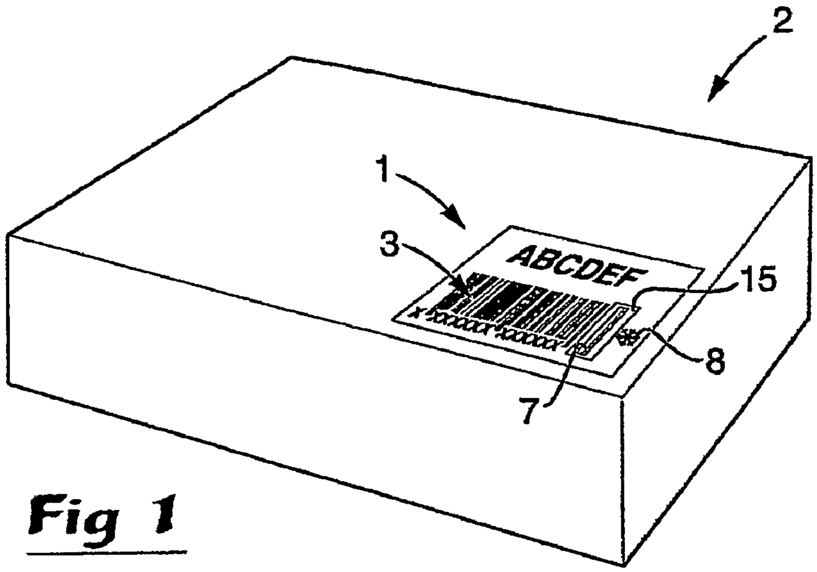
FIG. 1 is a perspective view of a package for goods and a label according to the invention.

In FIG. 1, a package 2 for goods is schematically shown, to which a label 1 is attached that comprises a print 3 with information about the goods in the package. The printed information may contain data on the identity, origin, price, best-before date, etc., of the goods and is optically readable. The printed information is coded and is, in this case, in the form of a bar-code 3 that is optically readable by means of a scanner of the type that regularly is utilized by producers, distributors, and in shops and cash-counters.

The label 1 is made of a material intended for thermal printing, and comprises therefor an upper layer 4 that is prepared with a colouring substance or a combination of substances, which at a certain elevated temperature react with each other in order to appear in a colour that contrasts with the base colour of the label, such as has been mentioned initially. The label comprises an area or surface field that is intended for the printing or typing of the bar-code 3 and that does not occupy the entire surface of the label. In other words, the bar-code 3 does not occupy the entire surface of the label, as is clearly seen in FIG. 1.

According to the invention, the label (see FIGS. 2-5) is manufactured from a substrate 5, e.g., a paper substrate, which is porous and capillary suctioning, and which therefore has the capacity of being wetted by and via capillary effects transporting a liquid in the liquid state. The thermal-printable layer 4 may be applied to the substrate 5 by, for instance, spraying of a liquid substance that is sucked into a certain depth in the substrate.

In this case, the label 1 has, on the underside thereof, an adhesive layer 6, by means of which the same is attachable to the package 2 for goods. A greater a number of labels may, in a conventional way, be carried by a common web, from which individual labels may be separated in order to be attached to the appurtenant packages for goods.

The label is prepared to destroy, if required, the readability of the bar-code 3, viz. in the case the goods in question and the package during the period between the labelling and sale at any instant of time is exposed to a higher storage temperature than the prescribed one, and thereby indicate that this has occurred. For this purpose, the label 1 is provided with a loading of a sub-stance 7 that contains a contrast-destroying agent, and that is solid up to a prescribed highest storage temperature for the goods in question, but transforms into the liquid state at temperatures above the maximally allowable one. The agent included in the substance 7 may be effective to initiate such a reaction of the colouring substance (or the colouring combination of substances) in the thermal-printable layer 4, that bars in the printed bar-code 3 are concealed in a coloured field that is formed by the reaction initiated by the agent. Alternatively, the agent in the substance 7 may make the printed code bars unreadable by bleaching or erasure. Here, it should be emphasized, that a bar-code in practice becomes unreadable already if an individual code bar loses the contrast thereof with the base colour of the label.

The agent in the substance 7 may comprise dissolved or non-dissolved reactants that have a pH-increasing effect in the substrate 5 and the thermal-printable layer 4, resulting in a bleaching of bars in the bar-code. Alternatively, the agent in the substance may also have a pH-lowering effect, resulting in the formation of a coloured field that conceals bars in the bar-code 3. In other words, the substance may comprise an acid, pH-lowering component, or an alkaline, pH-increasing component.

Substances that have the property of being solid, e.g., by being semi-plastic, up to a certain temperature value, but becoming liquid above the same, are typically found among oils. Among substances having pH-altering properties, organic solutions may be mentioned, such as alcohols, ketones, esters or ethers, detergents containing such organic solutions, softeners or plasticizers, mineral-oil solutions and ammonia waters.

The substance 7 is deposited on the surface of the label in such a position (see FIGS. 2 and 3), as well as in such a quantity and form, that the same, if it transforms into a liquid state, can, by virtue of the porosity and capillary-suctioning capacity of the substrate 5, propagate and migrate laterally in the substrate to the area of the print/bar-code 3. The deposition should be effected in or, in terms of time, near an environment in which the temperature meets or is below the prescribed, highest storage temperature of the goods, and in which the substance is solid, i.e., non-liquid.

In most cases, it is suitable to allow the code, e.g., on food articles, to remain intact even if said maximum temperature value has been exceeded during a shorter time. This is within the scope of the invention. By selecting suitable parameters of the propagation rate of the substance in the liquid state, such as the viscosity thereof, radial distance from the deposition of the sub-stance to prints as well as bleaching properties, the requisite exposure time of the label, above the limit temperature, before reading is blocked, may be chosen within the time range: some minutes-several days. It should also be pointed out that a commenced lateral propagation of liquid in the substrate and/or bleaching of prints, due to exposure to temperatures above the limit value, are interrupted if the temperature returns to a value below said limit temperature and the substance thereby returns to the solid state. This entails that the label has an accumulating temperature-monitoring function over time.

Tests

Propagation Rate of Thermal Paper TC 63 and 1-Decanol (Liquid).

Tests have been carried out with 1-decanol $C_{10}H_{22}O$, as well as a thermal paper of a type that is used for labels. The paper is coated with an upper protective layer (topcoat), and has a thickness of 67 μm. 1-Decanol is applied to the upper surface of the thermal paper by means of an adjustable pipette.

Tests have been carried out with two different quantities of liquid, 1 and 2 μl, respectively. The loading has been applied in the form of a bar having a length of 10 mm and a width of 2 mm.

The lateral propagation of the substance in the thermal paper in the liquid state has then been measured at an interval of 30 min. Said measured values are listed in Tables 1 and 2.

All tests have been carried out in room temperature (+22° C.)

TABLE 1

| Substance quantity 2 μl. | | | | |
|---|---|---|---|---|
| | Radial propagation (mm) | | | |
| Time (min) | Sample 1 | Sample 2 | Sample 3 | Sample 4 |
| 0 | 1 | 1 | 1 | 1 |
| 30 | 4 | 4 | 4 | 4 |
| 60 | 5 | 5 | 5 | 5 |
| 90 | 6 | 6 | 6 | 6 |
| 120 | 7 | 7 | 7 | 7 |

TABLE 2

| Substance quantity 1 μl. | | | | |
|---|---|---|---|---|
| | Radial propagation (mm) | | | |
| Time (min) | Sample 1 | Sample 2 | Sample 3 | Sample 4 |
| 0 | 1 | 1 | 1 | 1 |
| 30 | 3.5 | 3.5 | 3.5 | 3.5 |
| 60 | 4.5 | 4.5 | 4.5 | 4.5 |
| 90 | 5.5 | 5.5 | 5.5 | 5.5 |
| 120 | 6 | 6 | 6 | 6 |

The substance may, by being provided with additives, be modified to slow down the propagation rate thereof through the label substrate, for instance, by a viscosity-increasing additive. The viscosity of 1-decanol at +22° C. has been measured to be 34 mPa·s. The viscosity is critical to the lateral propagation rate in the thermal paper, and can be adjusted by additives to the sub-stance in question. Additives also influence the penetration rate of the substance of a possible protective layer (topcoat). Examples of additives having retarding effects are different types of silicone oils.

The bleaching rate depends on the properties of the specific thermal paper, as well as on the bleaching capacity of the substance. In this connection, it should also be mentioned that the substance's concentration of an effective, bleaching constituent influences the bleaching rate.

Examples of substances for the bleaching of thermal prints:

| Denomination | Setting/fusion temperature |
|---|---|
| pentadecane + 1-decanol | +8° C.-+2° C. |
| 1-decanol | +5° C. |
| 1-octanol | −15° C. |

By selecting the composition of "the substance", said maximum temperature value can be adjusted according to the application of the label. Said temperature value, at which transformation of the substance from the solid to the liquid state takes place, may, e.g., be adjusted to be −18° C. for quick-frozen foods, +2° C.-+8° C. for chilled products, and +28° C. for chocolate. For instance, it is also possible to form the substance and determine the location thereof in relation to the code in such a way that it makes impossible faultless reading of the entire code when, e.g., a pharmaceutical product has been exposed to a temperature above, for instance, +25° C. for at least 24 h in total or another time.

Below, an account follows of typical bleaching rates for a combination of thermal paper and substance suitable for the practice of the invention. Said combination should be appreciated as an example of suitable combinations, intended to elucidate a technical effect.

Tests

Bleaching Rate of the Thermal Paper TC 63 and 1-Decanol.

The bleaching process that arises upon contact between an existing thermal print and 1-decanol is listed in Table 3. The bleaching extent has been defined as a function of whether an individual code bar in a bar-code is readable or not. Reading of the bar-code has been carried out by a scanner of the type Intermec Maxiscan 2210. All tests have been carried out in room temperature (+22° C.).

TABLE 3

| Bleaching rate | | | | |
|---|---|---|---|---|
| | Readable | | | |
| Time (min) | Sample 1 | Sample 2 | Sample 3 | Sample 4 |
| 0 | Yes | Yes | Yes | Yes |
| 10 | Yes | Yes | Yes | Yes |
| 20 | Yes | Yes | Yes | Yes |
| 30 | No | No | No | No |

In tests with thermal paper having a less resistant typing, a faster bleaching effect is obtained.

When using a blackening substance, for instance, methyl adipate, the bar-code becomes unreadable in the same moment as the substance has penetrated laterally up to the code bars in question. Methyl adipate has a setting/fusion temperature of +4° C.

The label may be made with a marker 8 (see FIG. 3), the purpose of which is to indicate the status of the goods also to the naked eye. The marker 8 may be made as a symbol in the form of a snowflake, or have another form.

In one application, in which the substance 7 comprises a reactant having a pH-increasing effect on the thermal-printable layer 4 (resulting in a bleaching of one or more code bars that makes the bar-code 3 unreadable upon scanning), a corresponding bleaching of the coloured marker 8, beside the substance loading, provides an indication visible to the naked eye that the prescribed highest storage temperature has been exceeded.

Reference is now made to FIGS. 10 and 11, which illustrate equipment for the application of labels to packages for goods, as well as a number of devices included in the equipment in order to print the labels and provide the same with temperature-monitoring substance loadings.

In the equipment shown in FIG. 10, a conveyor 10, e.g., a conveyor belt, is included in a known way, by means of which goods in packages 2 are fed forward in a production line in the direction of the arrow V. In that connection, the packages 2 for goods move past a balance 11, which is electronically connected to a thermal printer 12 to be able to transfer information about the weight of the package for goods in question to the thermal printer, such as is outlined by means of the dashed line in FIG. 10. Labels 1 that are initially made with a thermal-printable material are fed in the direction of the arrow X past the thermal printer 12, which—by the supply of heat—provides the individual label with a bar-code 3 (according to FIGS. 2-5). In this case, the labels are carried on a common web 13, which may be fed out from a supply roll 22 (see also FIG. 11), and from which the labels can be separated consecutively by means of a return roller 23 in order to be transferred to the packages for goods in question that are fed forward underneath the label web 13. Near the return roller 23, a device 20 is arranged for the transfer and fixing of the individual label 1 onto the individual package for goods.

As far as the equipment shown in FIG. 10 has been described hitherto, the same is in all essentials previously known.

According to the invention, a loading of a substance 7 is deposited on the label 11*n* a position beside the bar-code 3, in a production step subsequent to the printing, specifically by means of a discharging member 14 and a nozzle 16 that is positioned downstream the thermal printer 12. In a later production step, the substance is encapsulated by means of a tool 19, which applies a covering 15 to the surface of the label in order to cover the loading of substance. A support frame 17 (see FIG. 11) carries the thermal printer 12, the nozzle 16 and the tool 19 at mutually adjustable and fixable distances, both in the feeding direction X and transverse to the same. In a completing production step, the labels 1, prepared in this way with a temperature-monitoring sub-stance loading, are fixed to the packages 2 for goods by means of the device 20 that may operate by means of compressed air, brushes, a piston, a pressing roll, or in another known way.

In an alternative embodiment, the deposition and encapsulation of the substance are integrated in one and the same production step following the printing of the bar-code, which, wherever applicable, is characterized in that the substance is deposited in a cavity formed in the covering (see FIG. 2) and is deposited on the surface of the label at the same time as the covering is attached to the surface.

In another alternative embodiment, the loading substance is not deposited and encapsulated onto the surface of the label until the label has been applied to the package for goods. In a further alternative embodiment, the deposition and encapsulation of the substance loading on the surface of the label may be carried out by a custom-made tool that simultaneously presses the label against the package for goods.

However, a feature common to the alternative embodiments is that a substance loading having the properties described above (i.e., contains a substance component that either can bleach/erase code bars, or conceal the same in a coloured field), is deposited and encapsulated onto the surface of the label beside the bar-code in order to, in the liquid state, propagate laterally to the bar-code through the porous, capillary-suctioning label substrate.

The nozzle 16, co-operating with the discharging member 14 for the deposition of the substance loading onto the surface of the label, is arranged to intermittently discharge very small sub-stance volumes, such as in the order of 1-25 μl. The nozzle 16 is controlled in synchronism with the thermal printer 12, in order to, after the printing of the bar-code 3, deposit the substance loading 7 beside the bar-code (see FIG. 3). The discharging member 14 and the nozzle 16 are in flow communication with a supply (not shown) of substance having the properties described above.

Figure 3:
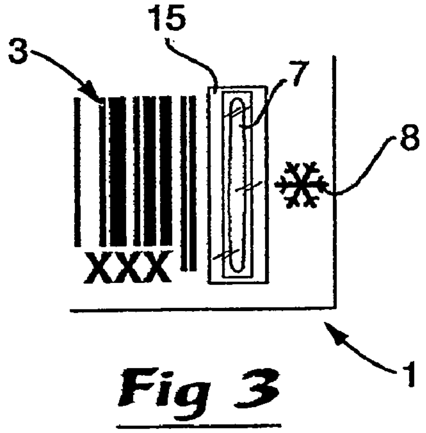
FIG. 3 is a partial plan view of the label according to FIG. 2.

Advantageously, the nozzle 16 is arranged to deposit the sub-stance 7 in the form of a string beside the bar-code 3 (see FIG. 3). In the example shown in FIG. 3, the substance string extends principally parallel to the code bars of the bar-code and has a length that substantially corresponds to the length of the code bars.

The nozzle 16 of the discharging member 14 is carried at a fixable distance from the thermal printer 12, on the frame 17, which suitably is common to the thermal printer 12, the nozzle 16 and the encapsulation tool 19. In this way, it is guaranteed that the substance 7 is deposited in the correct position in relation to the bar-code 3, irrespective of any deviations of the location of the labels on the carrying web 13, and irrespective of any alterations of the location of the web 13 during the feeding through the production equipment. Suitably, the location of the nozzle 16 in the support frame 17 is adjustable in relation to the thermal printer 12.

Preferably, the substance loading 7 is encapsulated by a covering 15 having a cavity 18 (see FIGS. 2 and 4) that is open toward the surface of the label 1. The cavity 18 is surrounded by a surface coated with adhesive in the underside of the covering in order to attach the covering to the label. The covering 15 may be produced from plastic, metal foil, paper, waxed paper, or paper coated with plastic foil. The covering may be coloured or transparent, and be moulded or die-cast into a cup shape, surrounded by a flange portion. Advantageously, the covering is made of a two-layer laminate, in which a first layer comprises at least one punched opening, which upon joining with a second, covering layer forms the cavity 18 for the substance loading.

In the alternative embodiment of the label that is shown in FIGS. 6-9, the substance loading 7 is deposited in a preformed depression in the surface of the label, wherein the covering 15 may be planar and made as a self-adhesive tape. Wherever applicable, the depression may be made as an opening, which is recessed in an upper protective layer 9 of the label.

The encapsulation tool 19, which may be air-driven, is, as has been mentioned above, carried at a fixable distance from the nozzle 16, and arranged and controlled to, in synchronism with the nozzle, pick the coverings 15 piece by piece from a supply 21, and apply the same to the labels fed past the encapsulation tool.

The coverings 15 are suitably arranged on a common backing (not shown), such as a web or film, which is fed from the supply 21 (see FIG. 11) toward or parallel to the label web 13. From the carrying web or film, the encapsulation tool 19 can pick and move the coverings to labels in movements that are synchronized with the feeding movements of the labels.

The transfer of the coverings 15 to the labels 1 may be realised in various ways. As an example, it should be mentioned that the encapsulation tool 19 may be arranged to, upon the application of a covering, move a distance with the label in the direction of motion thereof from the label supply 21. Correspondingly, the encapsulation tool may be arranged to, when picking a covering, move a distance with the covering in the direction of motion thereof. In that connection, the coverings and labels are suitably fed in opposite directions. Alternatively, however, both the deposition and encapsulation of the liquid are carried out onto intermittently fed labels.

Alternatively, a rotary tool may be introduced between a label web and a web fed above, but in the opposite direction, with coverings, the coverings being carried underneath the web. In doing so, the tool is rotated in the direction of motion of the covering web when picking covering from below, and in the direction of motion of the label web when applying covering from above. A back-pressure roller is suitably arranged below the label web, as well as a return roller or the like, which is effective to facilitate the separation of the coverings from the backing. A particular advantage is gained in this embodiment in the respect that the deposition of the substance can be integrated with the encapsulation of the same, by a discharging member in the form of a nozzle arranged to supply the substance directly into the upwardly facing cavity of the capsule, either through an opening in a perforated backing, or by injection through the backing material, in order to deposit the substance onto the surface of the label simultaneously with the application of the covering.

THE FUNCTION AND ADVANTAGES OF THE INVENTION

The label according to the invention works in the following way: As long as the ambient temperature is not higher than the maximally allowable storage temperature of the goods in the package in question, the substance loading in the label retains the solid state thereof, and stays unaltered in the location thereof beside the bar-code. In this state, the substance loading affects in no way the reading of the bar-code, which entails that the package for goods freely can pass a cash-counter and the computer thereof, without breaking the flow of goods through the cash-counter. However, if the package for goods at any instant before passing through the cash-counter is exposed to temperatures above the maximally allowable value, the substance transforms into a liquid state in which the same diffuses laterally in the porous substrate, and spreads in the same thanks to the capillary-suctioning capacity of the substrate. In the embodiment shown in FIGS. 2-5, the substance contains an (alkaline) sub-stance component, which, when the substance contacts the colouring in the nearest code bars, irreversibly bleaches the colour of the bars. In such a way, reading of the bar-code by means of scanner is made impossible. In order to attain said effect, it is, as is seen by a comparison between FIG. 3 and FIG. 5, sufficient that the substance destructs a few code bars in the area closest to the substance loading. Simultaneously, the substance may also bleach away a possible marker 8. Preferably, this does not take place until the substance during at least a predetermined total time has had a temperature above said maximum value.

In FIGS. 6-9, it is assumed that the substance 7 contains an (acid) substance component, which has the capacity of activating the colouring substance present in the thermal-printable layer 4, which colouring substance initially has not been affected by heat and which, therefore, has not produced any bars in such a way that the surface area around the printed bars becomes coloured. In this way, a number of code bars (and a possible marker) are concealed or "disappear".

FEASIBLE MODIFICATIONS OF THE INVENTION

Notwithstanding the fact that the invention above has been described in the context of packages for foods, it is realized that a label, arranged in the way described, likewise is useful in the context of other products having particular requirements of transportation and storage below prescribed maximal temperatures, such as pharmaceuticals, biological materials, chemical products, electronic components, etc. Neither is the label tied functionally to the information content in the bar-code or to any certain type of bar-code, for which reason, in this context, the expression "bar-code" should be understood to comprise all types of print containing coded information that is readable by means of a scanner. Furthermore, it should be emphasized that the label prepared in the way indicated also may constitute a product of its own that may be used without the conjunction with the production equipment described above, and in a ready-made condition be provided for the application, for instance, to a package for goods.

Although the label according to the invention has been described and exemplified as a separate item, which at some stage is adhered to the individual package, the same may also be made as an integrated part of the package. In this case, the porous substrate may be a portion of the proper package prepared with suitable, heat-sensitive colouring substances, the requisite sub-stance loading being applied to or in the substrate beside either an already printed bar-code or a surface field that is reserved for the printing of such a one. Instead of being encapsulated under a covering, the substance loading may also be contained in an outwardly entirely closed capsule. In such a way, there is offered the possibility of manufacturing and keeping the substance capsule at room temperature (either separately or applied to the label) until the moment of packaging, when it is cooled down and punctured in a primed state on the label.

The concept of "colouring substance", such as the same is used in the subsequent claims, should of course also be regarded to include such combinations of substances that have been accounted for above, and that have the capacity of triggering a colouring reaction when they are exposed to the effect of heat. For the sake of clarity, furthermore it should be pointed out that the label according to the invention as such also may be applied directly to an article of goods without the same having any surrounding package.

The invention claimed is:

1. A label (1) comprising, a colouring substance producing a print (3) by the effect of heat, the colour of which print (3) contrasts with base colour of the label (1), and an agent (7) capable of, at least partially, destroying contrast between said respective colours of said print (3) and label (1), if the label (1) is exposed to a temperature above a predetermined maximum value, the label (1) having a surface field for said print (3) containing coded information, a porous, capillary-suctioning substrate (5), and said agent is (7) which is included in a loading of a substance (7), which is solid at temperatures up to said maximum value, but becomes liquid above the same, and which loading of is located beside the surface field of the print (3), wherein both the print (3) and agent (7) are located on top of the porous, capillary-suctioning substrate (5) adjacent one another.

2. Label according to claim 1, wherein the agent in the substance (7) is a substance component having the capacity of activating said colouring substance in such a way that the same colours the label in the area around parts of the print.

3. Label according to claim 2, wherein said substance component is of the type that has a pH-lowering effect.

4. Label according to claim 2, wherein the substance (7) comprises a viscosity-increasing component having the purpose of—if the substance becomes liquid—slowing down the propagation rate thereof in the substrate (5).

5. Label according to claim 4, wherein the substance (7) is encapsulated in a cavity (18) that is open toward the surface of the label and formed in the underside of a covering (15) attached to the substrate, which covering has a surface running around the cavity, which surface is coated with adhesive.

6. Label according to claim 5, wherein the loading of substance (7) is in the form of a string, which extends principally parallel to code bars included in the print (3), and has a length that substantially corresponds to the length of the code bars.

7. Label according to claim 1, wherein the agent in the substance is a substance component having the capacity of bleaching the colour of a mentioned print present on said surface field.

8. Label according to claim 7, wherein the substance component is of the type that has a pH-increasing effect.

9. Label according to claim 1, wherein the substance (7) comprises a viscosity-increasing component having the purpose of—if the substance becomes liquid—slowing down the propagation rate thereof in the substrate (5).

10. Label according to claim 1, wherein the substance (7) is encapsulated in a cavity (18) that is open toward the surface of the label and formed in the underside of a covering (15) attached to the substrate, which covering has a surface running around the cavity, which surface is coated with adhesive.

11. Label according to claim 1, wherein the loading of substance (7) is in the form of a string, which extends principally parallel to code bars included in the print (3), and has a length that substantially corresponds to the length of the code bars.

12. Label according to claim 1, wherein the loading of substance (7) has a volume within the range of 1-25 μl.

13. A package (2) for the storage of goods in a temperature range having a predetermined maximum value, comprising a label (1) that has a print (3) made with coded information, which print (3) is achieved by the effect of heat on a colouring substance (4) included in the label (1), and has a colour that contrasts with base colour of the label (1), the label (1) including an agent (7) in order to, at least partially, destroy contrast between the print (3) and the base colour of the label (1), if the package (2) is exposed to a temperature above said maximum value, wherein the label (1) is manufactured from a substrate (5) of a porous, capillary-suctioning material, said agent (7) is included in a loading of substance (7) located beside the print (3), which substance is solid at temperatures up to said maximum value, but becomes liquid above the same, and both the print (3) and agent (7) are located on top of the porous, capillary-suctioning substrate (5) adjacent one another.

14. Equipment for the application of labels (1) on packages (2) for goods, comprising a conveyor (10) to feed packages (2) consecutively in a production direction, a supply (22) of labels (1), which are carried on a web (13) movable towards the packages, and which comprise a colouring substance of the type that has the capacity of producing a print by the effect of heat, the colour of which print contrasts with the base colour of the labels, a thermal printer (12) having the purpose of supplying heat to the individual label with the object of providing a print (3), within a delimited surface field of the label, having coded information, as well as a device (20) for the individual transfer of individual, printed labels (1) to individual packages (2), wherein between the thermal printer (12) and the transfer device (20), there are arranged, on one hand, a nozzle (16) to provide the individual label (1) with a loading of a substance (7) having the property of being solid at temperatures up to a predetermined maximum value, but becoming liquid above the same, and on the other hand a tool (19) for the encapsulation of the substance loading (7).

15. Equipment according to claim 14, wherein the same comprises a supply (21) of coverings (15), which are carried on a common backing, and can be fed toward the encapsulation tool (19) in order to, by means of the same, be transferred to labels (1), specifically in movements that are synchronized with the feeding movements of the labels.

16. Equipment according to claim 15, wherein the thermal printer (12), the nozzle (16) and the encapsulation member (19) are carried by a common support frame (17), which is located above the conveyor (10) for the packages (2).

17. Equipment according to claim 14, wherein the thermal printer (12), the nozzle (16) and the encapsulation member (19) are carried by a common support frame (17), which is located above the conveyor (10) for the packages (2).

18. A method for the application of labels on packages for goods, comprising the steps of:

a) feeding packages (2) consecutively in a production direction, b) feeding a web (13) of labels (1) towards the packages, which labels comprise a colouring substance of the type that has the capacity of producing a print by the effect of heat, the colour of which print contrasts with the base colour of the labels, c) producing a print (3), by the supply of heat to the same, in a surface field of the individual label (1), which print has coded information, d) individually transferring individual, printed labels (1) to individual packages (2), e) using labels that are made from porous, capillary-suctioning substrates (5), f) providing the individual label (1) with a loading of a substance (7) after the printing, which substance has the property of being solid at temperatures up to a predetermined maximum value, but becoming liquid above the same, the substance loading being located beside the print (3), and g) encapsulating the substance loading (7) before the individual label (1) is transferred to a package (2).

* * * * *